United States Patent
Jung

(10) Patent No.: US 9,205,334 B2
(45) Date of Patent: Dec. 8, 2015

(54) METHOD AND SERVER FOR PROVIDING ITEM OVERLAP EFFECT

(71) Applicant: INTELLECTUAL DISCOVERY CO., LTD., Seoul (KR)

(72) Inventor: Hyun Cho Jung, Seoul (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 0 days.

(21) Appl. No.: 13/988,092

(22) PCT Filed: Nov. 22, 2012

(86) PCT No.: PCT/KR2012/009918
§ 371 (c)(1),
(2) Date: May 17, 2013

(87) PCT Pub. No.: WO2013/085182
PCT Pub. Date: Jun. 13, 2013

(65) Prior Publication Data
US 2014/0287837 A1    Sep. 25, 2014

(30) Foreign Application Priority Data
Dec. 8, 2011  (KR) .................. 10-2011-0131327

(51) Int. Cl.
*A63F 13/12* (2006.01)
*A63F 13/30* (2014.01)
*A63F 13/00* (2014.01)

(52) U.S. Cl.
CPC ............. *A63F 13/12* (2013.01); *A63F 13/00* (2013.01); *A63F 2300/5533* (2013.01); *A63F 2300/609* (2013.01); *A63F 2300/8005* (2013.01)

(58) Field of Classification Search
USPC ........................................... 463/42
See application file for complete search history.

(56) References Cited

U.S. PATENT DOCUMENTS

2009/0104972 A1 *  4/2009  Itagaki et al. ............. 463/20

FOREIGN PATENT DOCUMENTS

| JP | 2010142306 A | 1/2010 |
|---|---|---|
| KR | 1020050091592 A | 9/2005 |
| KR | 1020080002357 A | 4/2008 |
| KR | 1020110015736 A | 10/2009 |

OTHER PUBLICATIONS

Written Opinion and International Search Report issued in International Application No. PCT/KR2012/009918 mailed Feb. 26, 2013, 7 pages.

\* cited by examiner

*Primary Examiner* — Pierre E Elisca
(74) *Attorney, Agent, or Firm* — Rothwell, Figg, Ernst & Manbeck, P.C.

(57) ABSTRACT

An item overlap effect provision method includes, by an item effect provision server, analyzing information on items possessed by the user upon receiving information indicating that game play of a user is completed from a game server, and analyzing whether or not the user possesses an overlap item, which is equal to an item registered in a preset slot so as to be used by the user during game play and is not registered in the preset slot, subtracting the usage number of the registered item and the usage number of the overlap item, which are preset on a per item basis and correspond to the number of times game play capable of using the items is performed, and applying weighted-grade points, which are preset according to the overlap item, to at least one game environment factor related to game play during implementation of next game play.

16 Claims, 8 Drawing Sheets

FIG.8

| APPLIED ITEM | | GAME ENVIRONMENT INFORMATION | | |
|---|---|---|---|---|
| NAME | RESIDUAL NUMBER | NAME | CONDITION | STAMINA |
| A | 27 | A | EXCELLENT (OVERLAP EFFECT) | 75% (25% CORRECTION) |
| B | 26 | B | POOR | 50% |
| ⋮ | ⋮ | ⋮ | ⋮ | ⋮ |
| C | 17 | C | EXCELLENT | 50% |

FIG.9

|  | APPLIED ITEM | | POSSESSED ITEM | | |
|---|---|---|---|---|---|
|  | NAME | RESIDUAL NUMBER | NAME | RESIDUAL NUMBER | |
| 123 → | A | 28 | A+10 | 28 | ← 124 |
|  | B | 27 | 13+3 | 27 | |
|  |  |  | C+3 | 27 | |
|  | ⋮ | ⋮ |  |  | |
|  | C | 27 |  |  | |

FIG.10

|  | APPLIED ITEM | | POSSESSED ITEM | | |
|---|---|---|---|---|---|
|  | NAME | RESIDUAL NUMBER | NAME | RESIDUAL NUMBER | |
| 133 → | A | 28 | A+10 | 27 | ← 134 |
|  | B | 26 | B+3 | 26 | |
|  |  |  | C+3 | 26 | |
|  | ⋮ | ⋮ |  |  | |
|  | C | 26 |  |  | |

| GRADE (141) | APPLICATION EFFECT (142) |
|---|---|
| 1 | |
| 2 | CONDITION IS POOR OR BETTER UPON NEXT GAME PLAY |
| 3 | EUQAL TO GRADE 2 |
| 4 | CONDITION IS AVERAGE OR BETTER UPON NEXT GAME PLAY |
| ⋮ | ⋮ |
| 7 | MAINTAIN USAGE NUMBER OF APPLIED ITEM DURING GAME PLAY |

METHOD AND SERVER FOR PROVIDING ITEM OVERLAP EFFECT

CROSS REFERENCE TO RELATED APPLICATIONS AND CLAIM OF PRIORITY

This patent application is a National Phase application under 35 U.S.C. §371 of International Application No. PCT/KR2012/009918, filed Nov. 22, 2012, which claims priority to Korean Patent Application No. 10-2011-0131327 filed Dec. 8, 2011, entire contents of which are incorporated herein by reference.

TECHNICAL FIELD

The present invention relates to technologies with regard to the play of a game in which items may be used, and more particularly to technologies to control a game environment that may have an effect on game play according to current item possession.

BACKGROUND ART

In recent years, the number of users who use game content is rapidly increasing with advances in graphic technologies and online network services. Various kinds of game content are provided to allow a user to get a vicarious thrill by manipulating a game character that acts as the user in a virtual world, or by manipulating various objects present in a real world.

In one example, in the case of a fantasy game, by generating a character that acts as the user in a fantasy world and causing the character to perform various actions with increase in the level of the character, the user may alleviate real world stress and enjoy a novel form of entertainment in a virtual world.

In another example, in the case of a soccer game, for example, by manipulating game characters that embody soccer players who are present in a real world, the user may become a coach, a player, or an owner of a club with regard to the soccer game, which allows the user to get a vicarious thrill and pleasure.

Game content involves various kinds of items that may be used in a game, in order to assist the user in comfortably performing a game and in having differentiation from other users with regard to game play.

There are present various kinds of items that may serve to improve status points of a game character that acts as the user, to assist a game character in acquiring experience points, and to decorate the outer appearance of a game character. The user may purchase or sell the items using cyber money that may be acquired according to game play, or may purchase the items via real cash payment.

Although the items basically have an effect of assisting a game character in efficiently playing a game, in recent years, a user desire to seek a novel form of entertainment via particular effects acquired by possessing the items is increasing.

SUMMARY

Therefore, it is an object of the present invention to provide technologies to control game environment factors that may have an effect on game play as well as status points of a game character through possession of items, thereby providing a user with a novel form of entertainment, increasing a user desire to possess items, and enhancing loyalty to game play.

In accordance with one aspect of the present invention, the above and other objects can be accomplished by the provision of an item overlap effect provision method including, by an item effect provision server, analyzing information on items possessed by the user upon receiving information indicating that game play of a user is completed from a game server, and analyzing whether or not the user possesses an overlap item, which is equal to an item registered in a preset slot so as to be used by the user during game play and is not registered in the preset slot, subtracting the usage number of the registered item and the usage number of the overlap item, which are preset on a per item basis and correspond to the number of times game play capable of using the items is performed, and applying weighted-grade points, which are preset according to the overlap item, to at least one game environment factor related to game play during implementation of next game play.

The analysis may include extracting at least one of information on the grade of the overlap item and information on the usage number of the overlap item.

The application may include setting different weighted-grade points according to the extracted information on the grade of the overlap item.

The subtraction may include maintaining the usage number of the registered item if the grade of the overlap item is a preset critical grade.

The application of the weighted-grade points may be omitted if the usage number of the overlap item, analyzed before the subtraction, expires.

The registered item may be a player character registered in a user team in an online sports game.

The overlap item may contain information on a player character that is equal to the registered player character, and may be a player character item that may be registered in the preset slot.

The game environment factor may be at least one of a condition factor and a stamina factor, the condition factor being a factor that changes status points of the registered item to be applied by a preset rate when the registered item is used during game play, and the stamina factor being a factor that is consumed during game play and reduces the status points to be applied in proportion to consumption thereof.

The weighted-grade points may determine a selection range of the preset rate when the preset rate included in the condition factor is randomly selected.

The weighted-grade points may correspond to a reduction rate in consumption of the stamina factor that will be consumed during game play.

In accordance with another aspect of the present invention, there is provided an item overlap effect provision method including, by an item effect provision server, receiving an input that registers any one of items that has a preset usage number and is possessed by a user, in a preset slot to utilize the item during game play, controlling a game server so as to apply the item registered in the preset slot during game play, analyzing whether or not the user possesses an overlap item, which is equal to the registered item and is not registered in the preset slot upon receiving information indicating completion of game play from a game server, subtracting the usage number of the registered item and the usage number of the overlap item, and applying weighted-grade points, which are preset according to the overlap item, to at least one game environment factor related to game play during implementation of next game play.

The analysis may include extracting information on the grade of the overlap item and information on the usage number of the overlap item.

The application may include setting different weighted-grade points according to the extracted information on the grade of the overlap item.

The subtraction may include maintaining the usage number of the registered item if the grade of the overlap item is a preset critical grade.

The application of the weighted-grade points may be omitted if the usage number of the overlap item, analyzed before the subtraction, expires.

The game environment factor may be at least one of a condition factor and a stamina factor, the condition factor being a factor that changes status points of the registered item to be applied by a preset rate when the registered item is used during game play, and the stamina factor being a factor that is consumed during game play and reduces the status points to be applied in proportion to consumption thereof.

In accordance with a further aspect of the present invention, there is provided an item overlap effect provision server including a registered item analysis module that analyzes information on an item registered in a preset slot to allow a user to utilize the registered item during game play upon receiving information indicating that game play of the user is completed from a game server, an overlap item analysis module that analyzes information on an overlap item, which is equal to the registered item and is not registered in the preset slot, by analyzing information on items possessed by the user, a usage number calculation module that subtracts the usage number of the registered item and the usage number of the overlap item, which are preset on a per item basis and correspond to the number of times game play capable of using the items is performed, and a game environment control module that applies weighted-grade points, which are preset according to the overlap item, to at least one game environment factor related to game play during implementation of next game play.

The game environment control module may apply different weighted-grade points according to extracted information on the grade of the overlap item.

The game environment control module may omit application of the weighted-grade points if the usage number of the overlap item, analyzed before the subtraction, expires.

According to the present invention, through possession of an item that is equal to a registered item, control of a game environment factor related to game play is possible, which allows a user to play a next game by reflecting the controlled game environment factor. In this way, it is possible to provide a user with a novel form of entertainment during game play, to increase a user desire to possess items, and to enhance loyalty to a game.

BRIEF DESCRIPTION OF DRAWINGS

FIGS. 7 to 10 are views showing examples of a game screen according to the respective embodiments of the present invention.

FIG. 11 is a view showing application of weighted-grade points according to the respective embodiments of the present invention.

DETAILED DESCRIPTION

Figure 1:
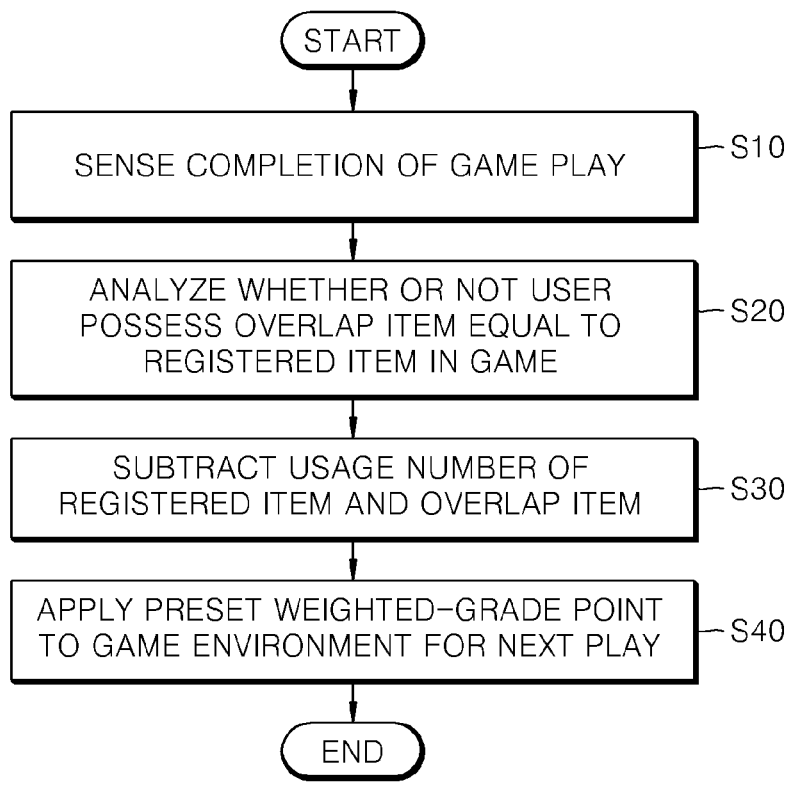
FIG. 1 is a flowchart of an item overlap effect provision method according to an embodiment of the present invention.

Hereinafter, a method and server for providing an item overlap effect according to the respective embodiments of the present invention will be described with reference to the accompanying drawings.

In the following description, a description of known technologies with regard to characteristics of the present invention will be omitted for clear understanding of the present invention. Those skilled in the art will appreciate that the following embodiments are given to aid in understanding of the present invention and there is no intent to limit the technical spirit of the present invention. Accordingly, other equivalent inventions that perform the same functions as those of the present invention will be within the scope of the present invention.

In the following description, the same or similar elements are denoted by the same reference numerals, and an unnecessary repeated description thereof and a description of known technologies will be omitted.

In the embodiments of the present invention, the terms "communication", "communication network", and "network" may be used interchangeably. The three terms refer to as wired/wireless local area and wide area data transmission/reception networks to enable transmission/reception of files between user terminals and between a user terminal and a download server.

In the following description, the term "game server" refers to a server computer that a user accesses to use game content. In the case of a game, the capacity of which is small or the number of users of which is small, a single game server may manage a plurality of game programs. In addition, in the case of a game, the capacity of which is very great or the number of real time access users is great, one or more game servers may be present to manage a single game according to the function of the game.

Additionally, although database middleware or payment processing servers may be connected to a game server, a description thereof will be omitted in the present disclosure.

In the present invention, an online game refers to game content that the user can use by accessing the aforementioned game server. In particular, the online game refers to a game that allows a plurality of users to simultaneously access and enjoy the game, and that enables level up by performing a certain behavior, such as character fostering and acquisition of experience points during game play. In addition, the online game refers to a game that enables purchase of various kinds of items for more efficient game play.

Here, items refer to all data that may assist game play and that may be understood as game items. In one example, in the case of a role playing game, examples of the items according to the present invention may include items to assist acquisition of greater experience points when a game character that acts as the user defeats a monster, and items to change the outer appearance of a game character. In addition, items, which are registered in a particular slot and assist a game character in easily playing the game with increasing status points of the game character, may be included in the items of the present invention.

In another example, in the case of a sports game, all items that will be used by a game character during game play, or by the user on a web-site so as to be reflected in the game as mentioned above, such as, for example, a card item to enable use of a game character, an item to increase status points of a game character for a predetermined duration, an item to restore condition of a game character, and an item worn by a game character to increase status points of the game character as well as to change the outer appearance of a game character, may be included in the items of the present invention.

The number of times items are used (hereinafter referred to as "usage number") may be indefinite or be limited. In this case, if items are equal to each other, but have a difference in the usage number thereof, the items may be regarded as being equal to each other. For example, assuming that an "A" item functions to increase status points of a game character while the game character plays a game 7 times and an "A1" item functions to increase status points of a game character while the game character plays a game 20 times, the two items may be regarded as being equal to each other, although an item database may regard the items as different items.

In addition, in the present invention, the usage number may be a limitation on use of items by the user, and may be set by a game manager. In the case of an item, the usage number of which expires, the user may renew the usage number of the item, or may remove the item without using it.

The usage number may be a predetermined number of matches in the case of a sports game. For example, assuming that the usage number of an item is preset to 10 matches of a sports game, the usage number expires when the user uses the corresponding item during 10 matches. That is, the usage number of the item may refer to the number of times the item is used.

FIG. 1 is a flowchart of an item overlap effect provision method according to an embodiment of the present invention.

Referring to FIG. 1, in the item overlap effect provision method according to an embodiment of the present invention, first, an item effect provision/control server receives information indicating that the user completes game play from a game server (S10).

In the present invention, the game play refers to a unit game that the user can play. For example, in the case of a sports game, the game play may refer to each match of the sports game. Thus, completion of the game play refers to completion of one match in the sports game.

In one example, in an online First Person Shooter (FPS) game, if the user, connected to a game use screen, completes a battle, it will be regarded as completion of game play.

In another example, in a gambling game, such as a poker game, if the user completes one game and pays or acquires game points, it will be regarded as completion of game play.

Whenever each game play is completed, the game server transmits information indicating the same to the item effect provision server.

If completion of the game play is sensed, that is, if the item effect provision server receives information indicating completion of the game play from the game server, the item effect provision server analyzes whether or not the user possesses a so-called overlap item in order to allow the user who has completed the game play to utilize an item effect during next game play (S20). Here, the overlap item refers to an item that is equal to an item registered in a preset slot and is possessed by the user without being registered in the preset slot.

In a game of the present invention, the user may register an item in a preset slot and use the registered item during game play. For example, in a role playing game, the user may wear an equipment item to utilize an effect provided by the equipment item in the game.

In one example, in the case of a sports game, the user may organize a user team using players. To this end, the user may register player character items in a slot corresponding to the user team. The registered player character items are regarded as players belonging to the user team, and may appear on a field during game play to allow the user to manipulate the players.

In another example, in the case of an FPS game, if an item, such as, for example, a gun, is registered in an inventory of the user, the user may effectively perform a battle using an effect of the registered gun on a game screen.

In addition to the aforementioned item registration, the user may store a possessed item in an item storage space. The item possessed by the user may be an item that may be registered in the aforementioned preset slot, or an item that may be used during game play.

Some of items that may be registered in the preset slot may be equal to the previously registered items. That is, the user may possess a plurality of items that is equal to one another, and may register and use any one thereof. In this case, a non-registered item is referred to as an overlap item. That is, the overlap item refers to an item that contains the same item information as that of the registered item and may be registered in the preset slot.

For example, in a sports game, a player character item may be registered in a slot corresponding to a user team. That is, the registered item refers to a player character belonging to the user team in the sports game.

Accordingly, the overlap item refers to an item that contains the same character information as that of the registered player character and that may be registered in the slot corresponding to the user team.

In the present invention, each item may have a grade. Even items that are equal to one another may have different grades. The grade of an item may be set to a predetermined probability upon acquisition of the item, and may be raised via a predetermined user action during game play. The greater the grade of the item, the more advantageous effect may be acquired in a game. For example, as the grade of an item is raised, status points of the item or status points of a game character equipped with the item may be increased. In addition, an item having a high grade may acquire new particular effects, such as, for example, an increase in the acquired experience points, or usability of special skills.

In the present invention, items, which have the same identification information even if they have different grades, are referred to as the same item. For example, in a sports game, assuming that the user possesses two character items corresponding to one player, even if the respective character items have different grades, the two items may be regarded as the same item in the present invention because these items correspond to one player.

If it is judged in Operation S20 that the registered item and an overlap item corresponding to the registered item are present, subtraction of the usage numbers of the registered item and of the overlap item is performed (S30).

In the present invention, an item has a predetermined usage number. For example, in a sports game, a player character corresponding to an item may be used only during a predetermined number of matches. If the user registers the item in a preset slot, the number of matches the player character can participate will be reduced whenever game play is completed, i.e. whenever one match ends. It may be assumed that the usage number of an item is set to, for example, 30 matches upon initial acquisition of the item. As mentioned above, if the usage number expires and becomes zero, the user may again set the usage number to, for example, 30 matches via extension of a usage duration.

In operation S30, subtraction of the usage number of the registered item that is preset as mentioned above and subtraction of the usage number of the overlap item corresponding to the registered item are performed simultaneously whenever game play is completed.

After subtraction of the usage numbers of the registered item and of the overlap item is performed, the item effect provision server applies weighted-grade points, which are preset on a per overlap item basis, to at least one game environment factor related to each game play during next game play (S40).

The next game play refers to a game that the user will play after completing current game play. For example, in a sports game, a scheduled match that will be executed after ending of one match is referred to as next game play.

The at least one game environment factor related to each game play refers to a factor that controls status points of the registered item or additional effect application values during game play. For example, status points of a user character that will be increased via addition of an item may be changed according to the game environment factor. The game environment factor may be differently set on a per item basis.

For example, in a sports game, the registered item may be a player character. In this case, the game environment factor may include at least one of a condition factor and a stamina factor of the player character.

The condition factor refers to a factor that may change status points of the player character to be applied to game play. In other words, status points of the player character may be changed by a preset rate according to the condition factor. The condition factor may be classified into a predetermined number of grades, such as excellent, good, average, fair, and poor. If the condition factor is excellent, status points of the player character may be raised by a preset rate such that increased status points are applied to game play. If the condition factor is poor, status points of the player character may be reduced by a preset rate such that reduced status points are applied to game play.

The stamina factor is a factor that is consumed via progress of a game. Consumption of the stamina factor means a reduction in status points. For example, status points applied when the stamina factor is 70 may be reduced by a preset rate as compared to status points applied when the stamina factor is 100, and the reduced status points may be applied to game play. The stamina factor may be consumed in real time during game play, starting from a value immediately before game play.

Accordingly, the condition factor and the stamina factor are included in the game environment factor that may control status points of the registered item that will be applied to game play, and the user utilizes items having different status points according to the game environment factor.

In this case, if an overlap item is present, weighted-grade points may be applied to the game environment factor that will be applied to next game play, which enables implementation of game play in an advantageous situation.

For example, in the above described case, the weighted-grade points may determine a selection range of the aforementioned preset rate included in the condition factor under the assumption that the preset rate is randomly selected and applied to next game play.

For example, it is assumed that the condition factor is classified into five grades including excellent, good, average, fair, and poor, and status points applied to the respective grades are set to 110%, 105%, 100%, 95%, and 90%. Each percentage refers to a value acquired by correcting status points of an item to be applied to game play based on the condition factor. That is, if original status points of the item are 100 and the conduction factor of the item is excellent, status points of the item to be applied to game may be 110.

Assuming that no weighted-grade points are applied, the grade of the condition factor may be randomly selected from among excellent, good, average, fair, and poor according to game results. However, if an overlap item is present, the condition factor may be set such that the grade of the condition factor is selected from among excellent, good, average, and fair, except for poor. This may prevent the user from applying the condition factor of poor to the registered item.

With regard to the stamina factor, weighted-grade points refer to a reduction rate in the consumption of the stamina factor during game play.

For example, assuming that consumption of the stamina factor of the registered item is 50 during game play, consumption of the stamina factor of the registered item during game play may be set to 25 if the overlap item is present.

As a result of providing advantages owing to possession of a plurality of items that are equal to one another by applying the weighted-grade points to the game environment factor in Operation S40, it is possible to provide the user with a novel form of entertainment, and thus to enhance loyalty to a game.

Figure 2:
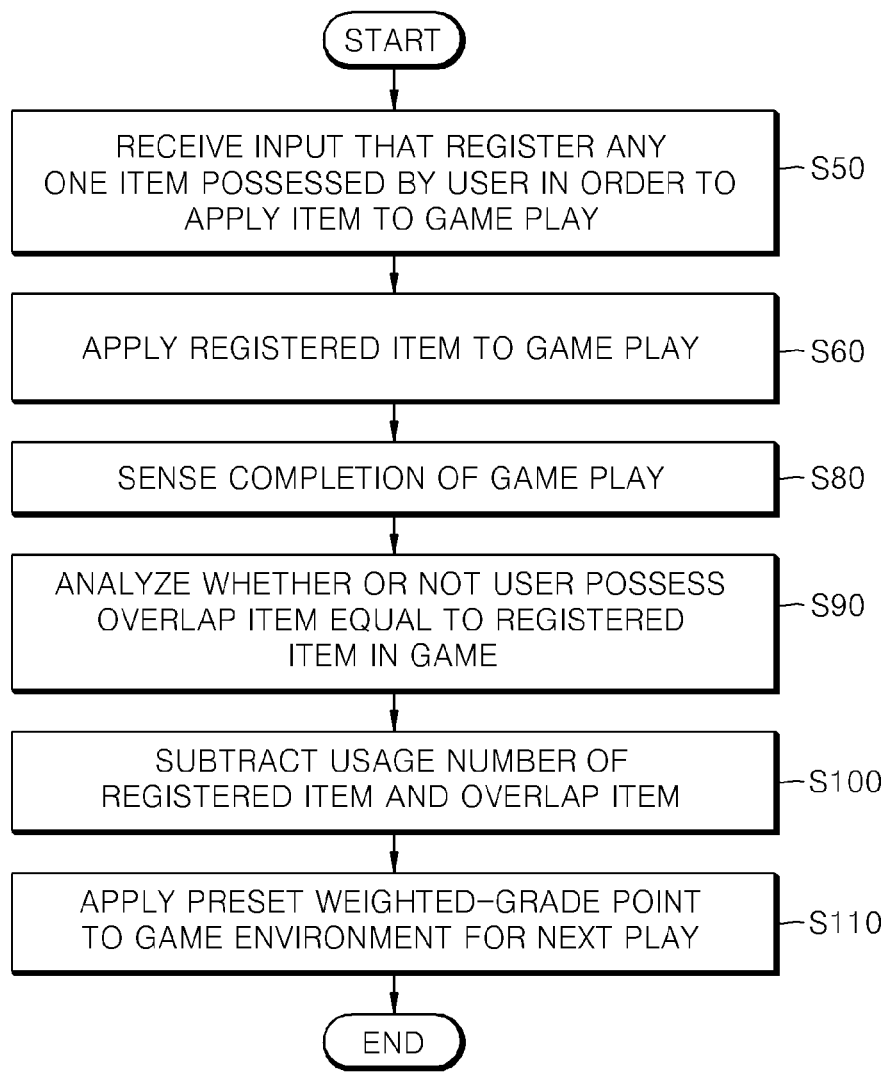
FIG. 2 is a flowchart of an item overlap effect provision method according to another embodiment of the present invention.

FIG. 2 is a flowchart of an item overlap effect provision method according to another embodiment of the present invention. A repeated part of the above description with regard to FIG. 1 will be omitted hereinafter.

More specifically, FIG. 2 shows the sequence in which the user registers an item to play a game.

First, the server receives an input that registers any one of items possessed by the user in a preset slot in order to utilize the item during game play (S50).

As mentioned above, to utilize an effect of the item during game play, it is necessary for the user to register the item in the preset slot. The user may register the item in the preset slot or may release registration of the item through, for example, a management menu, prior to playing a game.

After the game is initiated, the user plays the game under application of the registered item. In the case of a sports game, if the registered item corresponds to a player character, the player character registered in a slot corresponding to a user team appears as a player of the user team upon execution of the game, and the user may perform a match by manipulating the player.

Thereafter, in the same manner as in FIG. 1, sensing completion of game play (S80), analyzing whether or not the user possesses an overlap item, which is equal to the registered item and is not registered in the preset slot (S90), subtracting the usage numbers of the registered item and of the overlap item if the user possesses the overlap item (S100), and correcting a game environment factor related to next game play by applying weighted-grade points depending on the overlap item to the game environment factor (S110) are performed.

That is, in FIG. 2, the user may select an item to be applied to game play by registering the item in a preset slot prior to playing a game, which enables utilization of an item effect during game play.

Figure 3:
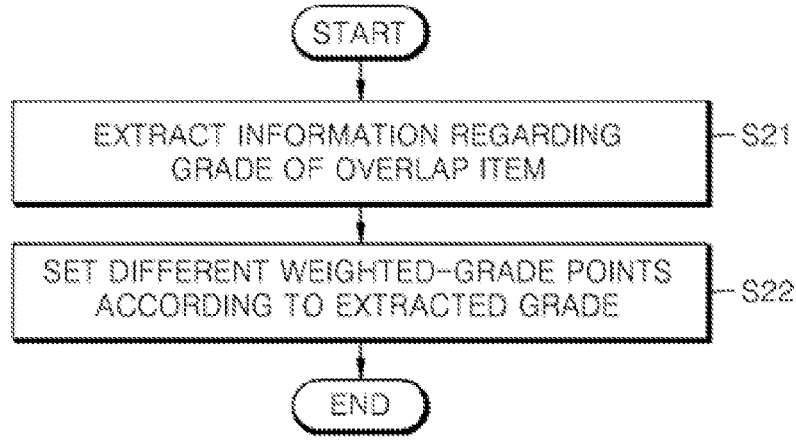
FIG. 3 is a flowchart showing application of weighted-grade points according to the respective embodiments of the present invention.

FIG. 3 is a flowchart showing application of weighted-grade points according to the respective embodiments of the present invention. In the following description, a repeated part of the above description with regard to FIGS. 1 and 2 will be omitted hereinafter.

Referring to FIG. 3, first, information regarding the grade of an overlap item is extracted (S21).

The server applies weighted-grade points to a game environment factor depending on the overlap item. As mentioned above, in the present invention, the grade of the item is preset, and an effect of the item is increased in proportion to the grade.

According to the feature of the present invention in which the item has the grade, the overlap item may also have various grades. Thereby, by allowing the server to apply different effects in terms of application of weighted-grade points, diversity with regard to application of the weighted-grade points to the game environment factor depending on the overlap item may be realized.

Accordingly, in the embodiment of FIG. 3, the server extracts information regarding the grade of the overlap item when analyzing whether or not the user possesses the overlap item.

Thereafter, setting different weighted-grade points according to the extracted grade information is performed (S22). The weighted-grade points depending on the grade of the overlap item may be stored in the server. The server matches the extracted grade information to data, such as, for example, a stored table, thereby setting weighted-grade points corresponding to the grade information to weighted-grade points to be applied to next game play.

Figure 4:
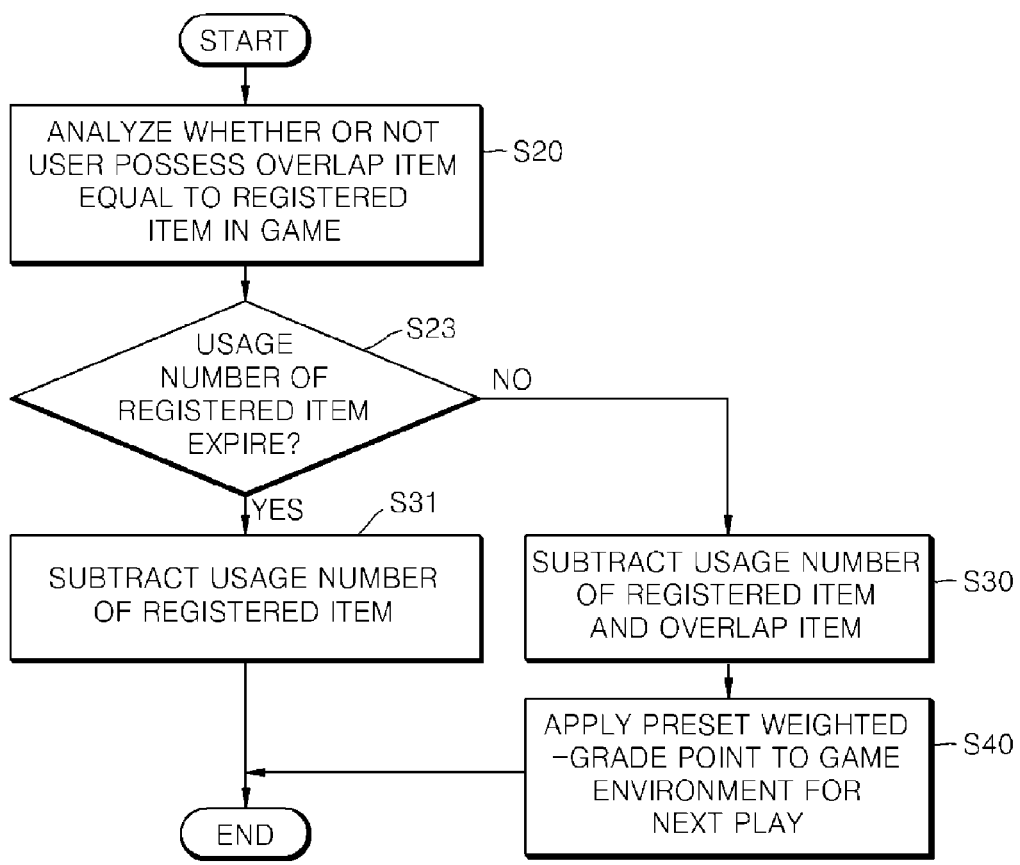
FIG. 4 is a flowchart showing the case in which the usage number of an overlap item expires according to the respective embodiments of the present invention.

FIG. 4 is a flowchart showing the case in which the usage number of the overlap item expires according to the respective embodiments of the present invention.

In the present invention, the registered item and the overlap item are reduced in usage number thereof whenever game play is completed. In Operation S30 for subtraction of the usage number that is performed as described in FIGS. 1 to 3, if the usage number of the overlap item becomes zero, subtraction may no longer be performed.

Therefore, even if presence of the overlap item is sensed, the server judges whether or not the usage number of the overlap item expires (S23). If the judged result shows that the usage number of the overlap item does not expire, the usage numbers of the registered item and of the overlap item are subtracted, and thereafter weighted-grade points are applied to the game environment factor depending on the subtraction results (S30 and S40).

As such, even if the usage number of the overlap item is 1, and thus becomes zero upon completion of game play, corresponding weighted-grade points are applied to next game play.

However, if the usage number of the overlap item expires before subtraction of the usage number, subtracting only the usage number of the registered item is performed (S31). In this case, no weighted-grade points are applied.

Figure 5:
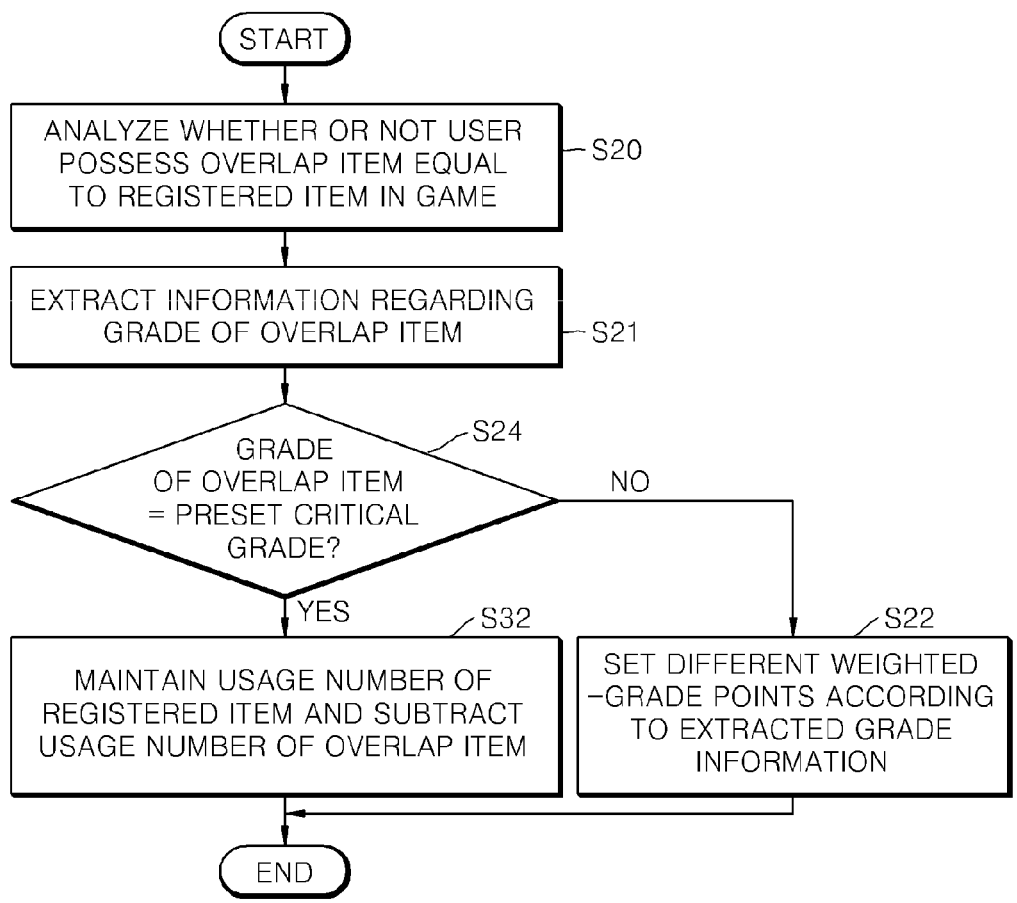
FIG. 5 is a flowchart showing application of an item effect depending on the grade of an overlap item according to the respective embodiments of the present invention.

FIG. 5 is a flowchart showing application of an item effect depending on the grade of the overlap item according to the respective embodiments of the present invention.

More specifically, FIG. 5 shows the effect acquired when the overlap item has the highest grade.

An upper limit of the grade of an item is preset. For example, even if the user attempts to enhance the strength of any one item, this enhancement may be impossible once the item reaches the highest grade, for example, 10. Thus, it can be said that the item exhibits the highest effect that the item can acquire.

In the present invention, with regard to weighted-grade points to be applied to a game environment factor, different weighted-grade points may be set on a per item grade basis. In the case, if the overlap item has the highest grade, this may provide the user with a novel form of entertainment.

That is, in the present invention, judging whether or not the user possesses the overlap item and extracting information regarding the grade of the overlap item (S20 and S21) are performed.

Thereafter, the server judges whether or not the grade of the overlap item is a preset critical grade. The preset critical grade may refer to the highest grade of an item that is preset on a per game basis.

If the judged result shows that the grade of the item is not the preset critical grade, setting different weighted-grade points according to the grade is performed (S22).

On the other hand, if it is judged that the grade of the item is the preset critical grade, the user subtracts only the usage number of the overlap item while maintaining the usage number of the registered item even if game play is completed (S32). Of course, although not exemplarily shown in FIG. 5, the weighted-grade points may be differently set according to the preset critical grade.

In this way, the user who possesses the overlap having the highest grade may acquire a special item effect, and thus a novel form of entertainment.

Figure 6:
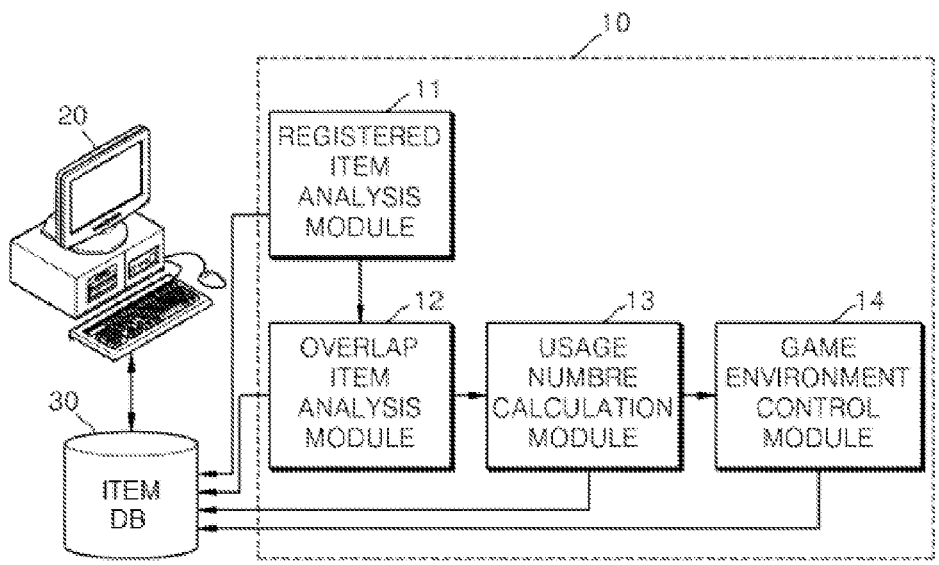
FIG. 6 is a view showing a configuration of an item overlap effect provision server according to an embodiment of the present invention.

FIG. 6 is a view showing a configuration of an item overlap effect provision server according to an embodiment of the present invention. In the following description, a repeated part of the above description with regard to FIGS. 1 to 5 will be omitted.

Referring to FIG. 6, the item overlap effect provision server 10 according to an embodiment of the present invention includes a registered item analysis module 11, an overlap item analysis module 12, a usage number calculation module 13, and a game environment control module 14.

The user may play a game by accessing a game server 30 through a user terminal 20. In this case, user information (more specifically, information on items possessed by the user) and information on the items are stored in the game server 30.

The registered item analysis module 11 extracts identification information on a registered item when receiving information indicating that game play is completed from the game server 30, and transmits the extracted information to the overlap item analysis module.

The overlap item analysis module 12 functions to extract an overlap item possessed by the user, which is equal to the registered item and is not registered, using the identification information on the registered item. In this case, the overlap item analysis module 12 may extract information regarding the grade of the overlap item, thereby allowing different weighted-grade points to be applied based on the extracted grade information.

The usage number calculation module 13 subtracts the usage number of the registered item and the usage number of the overlap item corresponding to the registered item upon completion of game play. In this case, as exemplarily shown in FIG. 4, if the usage number of the overlap item expires before subtraction of the usage number, only the usage number of the registered item is subtracted, and information indicating that the usage number of the overlap item expires is transmitted to the game environment control module 14.

In addition, the usage number calculation module 13 may receive information regarding the grade of the overlap item, and may control subtraction in such a way that the usage number of the registered item is maintained rather than being subtracted if the grade of the overlap item is a preset critical grade.

In this case, the game environment control module 14 has a control function to apply weighted-grade points to a game environment factor during next game play. More specifically, the game environment control module 14 may transmit the weighted-grade points to the game server 30, such that the weighted-grade points are applied to the game environment factor during next game play.

The game environment control module 14 may receive information regarding the grade of the overlap item from the overlap item analysis module 12, and apply different weighted-grade points according to the grade of the overlap item. In addition, if the usage number of the overlap item analyzed by the overlap item analysis module 12 is not subtracted by the usage number calculation module 13 and expires, that is, if the usage number of the overlap item expires even upon completion of game play, application of the weighted-grade points is omitted.

FIGS. 7 to 10 are views showing examples of a game screen according to the respective embodiments of the present invention.

Figure 7:
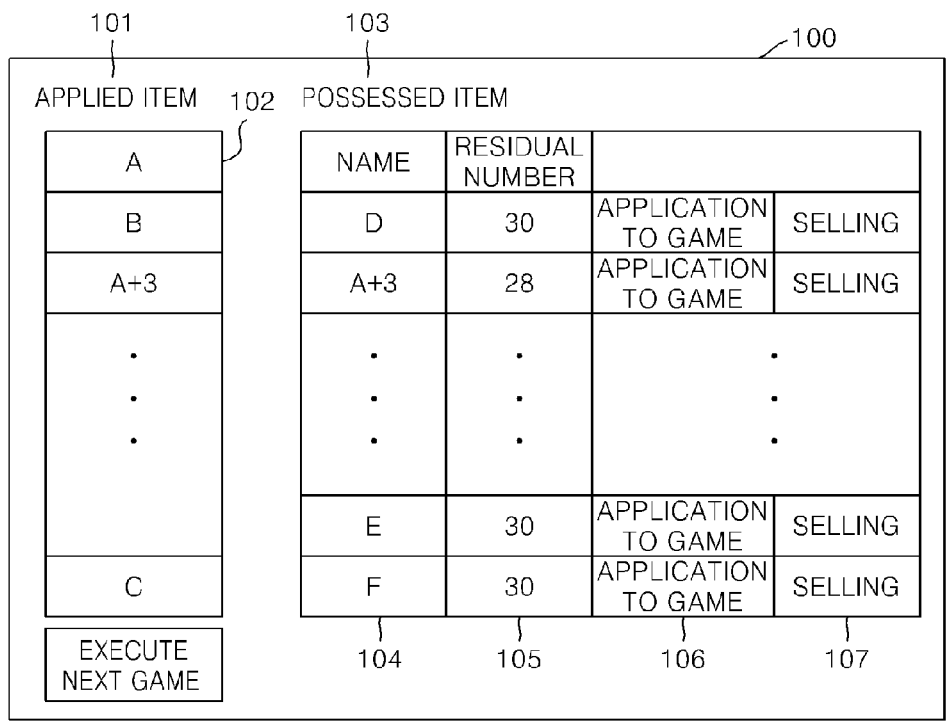

Referring to FIG. 7, the user may check an applied item slot 101 and a possessed item space 103 on an inventory screen 100.

The applied item slot 101 displays a list of registered items 102 to allow the user to utilize the registered items 102 during game play. The user may select an item from the possessed item space 103 and register the selected item in the applied item slot 101. In the case of contrary input, the user may delete any one of the items 102 registered in the applied item slot 101.

Detailed information on non-registered items may be checked from the possessed item space 103. In this case, a menu that shows names of respective items 104, a menu that shows a residual usage number 105, a menu 106 that assists the user in registering non-registered items in the applied item slot 101, and a menu 107 that assists the user in auctioning off items in an item shop may be displayed.

Referring to FIG. 8, it will be appreciated that weighted-grade points are applied to the game environment factor during next game play that may be acquired by the user according to whether or not the user possesses the overlap item.

First, when checking the applied item slot 111, a name of the registered item 112 and a residual usage number 113 are displayed.

Meanwhile, a game environment information screen 114 may display a game environment factor upon next game play. In the present invention, different game environment factors may be set on a per item basis.

A name of the registered item 115, and a condition factor 116 and a stamina factor 117 as game environment factors may be checked from the game environment information screen 114. It can be checked from the game environment information screen that, if the user possesses an "A" item that is equal to a registered item and is not registered, effect content indicating that the user possesses an overlap item is output, and weighted-grade points are applied to a condition factor 118 and a stamina factor 119 of the "A" item as an overlap item.

FIGS. 9 and 10 show an example of subtraction of the usage number in the case in which the user possesses an overlap item having a preset critical grade.

Referring to FIG. 9, an applied item slot 121 and a possessed non-registered item list 112 may be checked in an inventory 120. In this case, it can be checked from information on a registered "A" item 123 that a residual usage number is 28, and it can be checked from item information 124 of the non-registered item list 112 that the grade of the "A" item is 10. In the present invention, the preset critical grade is assumed to be 10.

Referring to FIG. 10, by checking information on the "A" item 133 from an applied item slot 131 of an inventory 130 upon completion of game play, it will be appreciated that a residual usage number is maintained at 28. Meanwhile, by checking information on the "A" item 134 having the grade of 10 from a non-registered item list 132, it will be appreciated that the residual usage number is reduced from 28 of FIGS. 9 to 27.

FIG. 11 is a view showing application of weighted-grade points according to the respective embodiments of the present invention.

A grade information list 141 and an application effect list 142 corresponding to the grade information list 141 may be checked from a table 140 of FIG. 11.

The application effect list 142 shows weighted-grade points to be applied to a game enhancement factor, which may be differently set on a per grade basis as shown in the grade information list 141. It will be appreciated that weighted-grade points are applied to a condition factor according to each grade during next game play. In addition, the weighted-grade points are set to maintain the usage number of a registered item if the item has the highest grade of n.

The item overlap effect provision method according to the embodiments of the present invention as described above may be executed by an application that is originally equipped in a terminal (the application may include a program included in, for example, a basic platform or management system equipped in the terminal), or may be executed by an application (i.e. a program) that is installed, by a user, to the terminal through an application provider server, such as a web server associated with a corresponding service or application, or an application store server. In this regard, the item overlap effect provision method according to the above described embodiments of the present invention may be realized by the application (i.e. the program) that is originally equipped in the terminal or the application that is installed to the terminal by the user, and the method may be recorded in a recording medium that may be read by a computer, for example, a terminal.

The above described functions may be executed as the aforementioned program is recorded in a computer readable recording medium and is executed by a computer.

As described above, to execute the item overlap effect provision method according to the respective embodiments of the present invention, the aforementioned program may include computer code, such as a C, C++, or JAVA code, machine code, etc., that may be read by a computer processor, such as a Central Processing Unit (CPU).

The code may include function code associated with, for example, a function that defines the above described functions, and may also include control code associated with an execution procedure that assists the computer processor in executing the above described functions in a predetermined fashion.

In addition, the code may further include memory reference code with respect to additional information required for the computer processor to execute the above described functions, or with respect to information on whether media will be referred to at any position (address) of an internal or external computer memory.

In addition, if the computer processor requires communication with any other remote computers, servers, or the like in order to execute the above described functions, the code may further include communication protocol related code that designates a communication method between the computer processor and any other remote computers, servers, or the like using a computer communication module (for example, a wired and/or wireless communication module) as well as information or media for transmission/reception during communication.

A functional program to realize the present invention, and code and code segments related to the program, for example, may be easily deduced or changed by programmers of the art of the present invention in consideration of, for example, a computer system environment for reading of a recording medium and execution of a program.

The computer readable recording medium, in which the above described program is recorded, may include a ROM, a RAM, a CD-ROM, a magnetic tape, a floppy disc, or an optical media storage device, for example.

In addition, the computer readable recording medium, in which the above described program is recorded, may be distributed in a computer system that is connected to the recording medium via a network, and may store and execute code that may be read in a distributed manner by the computer. In this case, at least one computer among a plurality of distributed computers may execute some of the above proposed functions, and may transmit the execution results to at least one of the other distributed computers. Likewise, the computers that receive the results may execute some of the above proposed functions, and may transmit the execution results to the other distributed computers.

In particular, the computer readable recording medium, in which an application, i.e. a program for execution of the item overlap effect provision method according to the respective embodiments of the present invention may be a storage medium (for example, a hard disk) included in an application provider server, such as an application store server, a web server related to an application or a corresponding service, or the like, or may be an application provider server.

The computer, which can read the recording medium, in which the application, i.e. the program for execution of the item overlap effect provision method according to the respective embodiments of the present invention, may include a general PC, such as a general desktop or laptop computer, a smart phone, a tablet PC, a Personal Digital Assistant (PDA), and a mobile terminal such as a mobile communication terminal, and moreover, may be construed as all possible computing devices.

In addition, if the computer, which can read the recording medium, in which the application, i.e. the program for execution of the item overlap effect provision method according to the respective embodiments of the present invention, is a smart phone, a tablet PC, a PDA, or a mobile terminal, the application may be downloaded from the application provider server into the general PC, and may be installed in the mobile terminal via a synchronization program.

Although all the constituent elements of the embodiments of the present invention have been described as being combined into one or being operated in a combined state, the present invention is not essentially limited to the embodiments. That is, all the constituent elements may be selectively combined into and operated as at least one element within the scope of the present invention. In addition, although all the constituent elements may be realized respectively as independent hardware, some or all of the constituent elements may be selectively combined and be realized as a computer program having a program module that performs some functions or all functions of one piece of hardware or a plurality of pieces of hardware. The codes and code segments constituting the computer program may be easily deduced by those skilled in the art. The embodiments of the present invention may be realized as the computer program is stored in the computer readable medium that can be read by the computer and is read and executed by the computer. The storage medium for the computer program may include a magnetic recording medium, an optical recording medium, and the like.

In the above description, the terms "comprise," "constitutes" or "have" specify the presence of stated constituent elements so long as there is no particular description to the contrary, and therefore should be construed as further including other constituent elements, rather than excluding other constituent elements. All terms including technical or scientific terms, so long as they are not differently defined, have the same meaning as generally understood by those skilled in the art. The generally used terms, such as dictionary terms, should be construed as having the same meaning as the contextual meaning of the related art, and should not be construed as having ideal meaning or excessively formal meaning so long as they are not clearly defined in the present invention.

Although the embodiments of the present invention have been disclosed for illustrative purposes, those skilled in the art will appreciate that various modifications, additions and substitutions are possible, without departing from the scope and spirit of the invention as disclosed in the accompanying claims. Accordingly, the disclosed embodiments of the present invention are given only by way of explanation, rather than limiting the technical idea of the present invention, and the technical scope of the present invention is not limited by the embodiments. The protection range of the present invention should be construed by the following claims, and all technical ideas within the equivalent range thereof should be construed as being within the scope of the present invention.

The invention claimed is:

1. A method for providing item overlap effect, the method comprising:
    analyzing, by an item effect provision server, electronic information on items possessed by the user to determine whether or not the user possesses an electronic overlap item, which is equal to an electronic item registered in a preset slot so as to be used by the user during the electronic game play and is not registered in the preset slot, wherein the analyzing includes that the electronic overlap item is electronically available for processing in another electronic game play; and
    applying, by the item effect provision server, weighted-grade points, which are preset according to the electronic overlap item, to at least one electronic game environment factor related to the electronic game play during implementation of next electronic game play.

2. The method according to claim 1, wherein the analysis of the electronic information on items includes extracting at least one of information on a grade of the electronic overlap item or information on the usage number of the electronic overlap item.

3. The method according to claim 2, wherein the analysis of the information on electronic items includes extracting the electronic information on the grade of the electronic overlap item, and the application of the weighted-grade points includes setting different weighted-grade points according to the extracted electronic information on the grade of the electronic overlap item.

4. The method according to claim 2, further comprising subtracting a usage number of the registered electronic item and a usage number of the electronic overlap item, which are preset on a per item basis and correspond to the number of times the electronic game play capable of using the electronic items is allowed to be performed, and wherein the subtraction of the usage number includes maintaining the usage number of the registered electronic item if the grade of the electronic overlap item is a preset critical grade, and wherein the application of the weighted-grade points is omitted if the usage number of the electronic overlap item expires.

5. The method according to claim 1, wherein the registered item is a player character registered in a user team in an online sports game.

6. The method according to claim 5, wherein the electronic overlap item contains additional electronic information on a player character that is equal to the registered player character, and the electronic overlap item is a player character item that is registered in the preset slot.

7. The method according to claim 1, wherein the electronic game environment factor is at least one of a condition factor or a stamina factor, the condition factor being a factor that changes status points of the registered electronic item to be applied by a preset rate when the registered item is used during the electronic game play, and the stamina factor being a factor that is consumed during the electronic game play and reduces the status points to be applied in proportion to consumption thereof.

8. The method according to claim 7, wherein the weighted-grade points determine a selection range of the preset rate when the preset rate included in the condition factor is randomly selected.

9. The method according to claim 7, wherein the weighted-grade points correspond to a reduction rate in consumption of the stamina factor that is consumed during the electronic game play.

10. The method according to claim 1, further comprising:
receiving, by the item effect provision server, an input that registers any one of the electronic items that has a preset usage number and is possessed by the user, in the preset slot to utilize the electronic item during the electronic game play; and
controlling the game server so as to apply the electronic item registered in the preset slot during the electronic game play.

11. An item overlap effect provision server, comprising a memory, a processor coupled to the memory, the processor utilizing:
a registered item analysis module that is configured to analyze electronic information, received from a game server, on an electronic item registered in a preset slot to allow a user to utilize the registered item during electronic game play;
an overlap item analysis module that is configured to analyze the electronic information on an electronic overlap item, which is equal to the registered electronic item and is not registered in the preset slot, by analyzing electronic information on items possessed by the user, wherein the analyzing includes that the electronic overlap item is electronically available for processing in another electronic game play; and
a game environment control module that is configured to apply weighted-grade points, which are preset according to the electronic overlap item, to at least one electronic game environment factor related to the electronic game play during implementation of next electronic game play.

12. The server according to claim 11, wherein the game environment control module is configure to apply different weighted-grade points according to extracted information on a grade of the electronic overlap item.

13. The server according to claim 11, wherein the game environment control module is configured to omit the application of the weighted-grade points if the usage number of the electronic overlap item expires.

14. The server according to claim 11, further comprising a usage number calculation module that is configured to subtract a usage number of the registered electronic item and a usage number of the electronic overlap item, which are preset on a per item basis and correspond to the number of times the electronic game play capable of using the items is allowed to be performed.

15. A non-transitory computer readable recording medium in which a program executed by a computer for implementing an item overlap effect provision method is recorded, the method comprising:
analyzing, by an item effect provision server, electronic information on items possessed by the user to determine whether or not the user possesses an electronic overlap item, which is equal to an item registered in a preset slot so as to be used by the user during electronic game play and is not registered in the preset slot, wherein the analyzing includes that the electronic overlap item is electronically available for processing in another electronic game play; and
applying weighted-grade points, which are preset according to the electronic overlap item, to at least one electronic game environment factor related to the electronic game play during implementation of next electronic game play.

16. The computer readable recording medium of claim 15, selected from the group consisting of a ROM, a RAM, a CD-ROM, a magnetic tape, a floppy disc, and an optical media storage device.

* * * * *